United States Patent [19]
Kataoka et al.

[11] Patent Number: 5,491,730
[45] Date of Patent: Feb. 13, 1996

[54] COOLING SYSTEM FOR PRIMARY CONTAINMENT VESSEL IN NUCLEAR POWER PLANT AND COMPONENT FOR USE IN SAID COOLING SYSTEM

[75] Inventors: Yoshiyuki Kataoka, Ibaraki; Michio Murase, Mito; Hidefumi Araki; Yasutaka Iwata, both of Hitachi, all of Japan

[73] Assignee: Hitachi, Ltd., Tokyo, Japan

[21] Appl. No.: 177,723

[22] Filed: Jan. 5, 1994

[30] Foreign Application Priority Data

Mar. 11, 1993 [JP] Japan ................. 5-050375

[51] Int. Cl.⁶ .................................. G21C 9/004
[52] U.S. Cl. ................................................ 376/283
[58] Field of Search .......................... 376/282, 283, 376/299

[56] References Cited

U.S. PATENT DOCUMENTS

| | | | |
|---|---|---|---|
| 4,305,896 | 12/1981 | Tominaga et al. | 376/283 |
| 4,399,082 | 8/1983 | Becker et al. | 376/283 |
| 5,059,385 | 10/1991 | Gluntz et al. | 376/283 |
| 5,377,243 | 12/1994 | Hill | 376/283 |

FOREIGN PATENT DOCUMENTS

| | | | |
|---|---|---|---|
| 53-143887 | 12/1978 | Japan | 376/283 |
| 61-29679 | 7/1986 | Japan | 376/283 |
| 63-1995 | 1/1988 | Japan | 376/283 |
| 4-98198 | 3/1992 | Japan . | |
| 4-136794 | 5/1992 | Japan . | |

OTHER PUBLICATIONS

Fifth International Topical Meeting On Reactor Thermal Hydraulics, Vol. II. (Sep. 1992), pp. 547–555.

Primary Examiner—Daniel D. Wasil
Attorney, Agent, or Firm—Antonelli, Terry, Stout & Kraus

[57] ABSTRACT

Pipes are mounted horizontally on an outlet portion of a gas vent pipe in a condenser-type heat removal system, and have openings which are formed only in a portion below a horizontal plane in which axes of these pipes lie, thereby enlarging a region where uncondensed steam is mixed with water in a suppression pool. With this arrangement, a surface portion of the water of the suppression pool is prevented from becoming hot, and the temperature of this pool water is uniformed. As a result, the temperature of the water surface of the suppression pool is lowered, thereby decreasing the pressure within a primary containment vessel. This enhances the reliability of the primary containment vessel, and reduces a design strength of the primary containment vessel.

3 Claims, 12 Drawing Sheets

COOLING SYSTEM FOR PRIMARY CONTAINMENT VESSEL IN NUCLEAR POWER PLANT AND COMPONENT FOR USE IN SAID COOLING SYSTEM

BACKGROUND OF THE INVENTION

This invention relates generally to a cooling system for a primary containment vessel (PCV) in a nuclear power plant, and more particularly to a passive cooling system with no active components (e.g. pumps) which system has an improved performance.

Passive cooling systems for a primary containment vessel in a nuclear power plant are less subjected to a malfunction because they do not employ active components such as pumps, and therefore are high in reliability.

One type of such passive cooling system is a condenser-type heat removal system disclosed, for example, in Japanese Patent Unexamined Publication Nos. 4-98198 and 4-136794.

In such a cooling system, a cooling water pool is provided outside a pressure boundary of a primary containment vessel, and a condenser (heat exchanger) is provided within this cooling water pool, which condenser is connected to a main steam line from the Reactor Pressure Vessel or to a gas-phase space in the primary containment vessel.

In this technique, when a loss of coolant accident (LOCA), which must be taken into consideration in designing the Nuclear Power Plant, occurs, steam produced in a reactor pressure vessel is led to the condenser, and is condensed there. At this time, uncondensed steam which has not been condensed in the condenser is discharged, together with noncondensable gas introduced into the condenser from the gas-phase space of the primary containment vessel, into a suppression pool within the primary containment vessel through a gas vent pipe, and this uncondensed steam is condensed in the water of this suppression pool such that the heat produced by this condensation is accumulated as sensible heat in the suppression pool. Thus, a pressure increase of the primary containment vessel at the time of an accident is suppressed.

With respect to this condenser-type heat removal system, a thermal-hydraulic behavior by the uncondensed steam discharged into the suppression pool through the gas vent pipe is described in "Proc. of Fifth International Topical Meeting on Reactor Thermal Hydraulics, Vol II (September 1992) pages 547–555".

Japanese Patent Unexamined Publication No. 63-1995 discloses another conventional arrangement in which there is provided a steam discharge device for discharging steam from a reactor pressure vessel into a pool water via a discharge pipe (vent pipe) and a safety relief valve, and a discharge portion of the discharge pipe (vent pipe) is constituted by a horizontal pipe having a plurality of holes or opening through which the steam is discharged into the pool water. The steam is discharged from the discharge holes in a fine manner, and the discharge holes are dispersed at such a density that steam bubbles from the adjacent holes can not easily be combined together.

The above Japanese Patent Unexamined Publication No. 63-1995 does not describe the combination of this steam discharge device with a condenser-type heat removal system.

In the conventional condenser-type heat removal system, a non-condensable gas, charged during a normal operation in the gas-phase space in the primary containment vessel surrounding the reactor pressure vessel, flows together with steam, into a condenser at the time of an accident when a cooling system is operated, thereby degrading the condensation capability.

In order to deal with the uncondensed steam which has not been condensed as a result of the degraded condensation capability, there is provided a gas vent pipe extending from a heat exchanger (condenser) into a suppression pool to introduce the uncondensed steam into the water in the suppression pool for condensation.

In the prior art technique, however, heat of the uncondensed steam discharged into the water of the suppression pool is presumed to be absorbed as sensible heat of the pool water at a depth to which the gas vent pipe is submerged, and no consideration has been given to a thermal-hydraulic behavior in the water of the suppression pool.

Referring to the thermal-hydraulic behavior in the suppression pool described in the above-mentioned literature, the uncondensed steam discharged from the gas vent pipe into the suppression pool is condensed by the water of this pool.

However, since an amount of the uncondensed steam flowing into the suppression pool is small, condensation is finished after only a part of the pool water disposed in the close vicinity of the outlet of the gas vent pipe is made hot. The hot water produced by this condensation moves upward to the suppression pool surface while forming a thin thermal boundary layer (having a thickness of about 10–15 cm) along the gas vent pipe.

Moreover, the region where the water is made hot in the vicinity of the outlet of the gas vent pipe is small, and therefore the volume of that portion of the suppression pool water which produces buoyancy by the high temperature is small. As a result, flow can not be induced in the suppression pool water, and the bulk water except for vicinity of the gas vent pipe remains stagnant.

Furthermore, in the suppression pool water, there is not provided any cooling means for inducing a downward flow from the water surface of the suppression pool. Therefore, the hot water rising along the gas vent pipe will not be mixed with the bulk water in the suppression pool.

Namely, since the condensation region is small, a relatively great temperature rise of the suppression pool water due to the condensation occurs in a localized portion of the suppression pool, and the hot water moves upward to the surface of the suppression pool water without being sufficiently mixed with the surrounding bulk and the hot water is accumulated in the vicinity of the surface of the pool water upon arrival at this water surface.

As a result, in the event of an accident, only an upper layer of the suppression pool water near to the water surface thereof is made hot. In other words, the water of the suppression pool is not sufficiently effectively used as a heat absorption source.

Under the circumstances, the following problems arise in view of a pressure behavior of the primary containment vessel at the time of an accident, as well as the strength of this containment vessel which should withstand this pressure behavior.

Namely, if only the upper layer of the suppression pool water near to the water surface thereof becomes hot as described above, this hot water causes the temperature of the gas-phase space (wetwell) at the upper portion of the suppression pool to rise, thereby increasing a steam partial pressure in this space.

The pressure within the primary containment vessel at the time of an accident corresponds to the sum of the partial pressure of the noncondensable gas and the steam partial pressure in the wetwell. Therefore, an increase of the steam partial pressure means a pressure increase in the primary containment vessel at the time of an accident, and the strength of the primary containment vessel must be increased in order to withstand this pressure.

Alternatively, it is necessary to increase a heat transfer area of the heat exchanger mounted in the cooling water pool provided at the upper portion of the primary containment vessel so that the uncondensed steam which will cause the steam partial pressure to increase will not flow into the suppression pool. In this case, in conformity with the increase of the heat transfer area of the heat exchanger, the capacity of the cooling water pool disposed at the high level must be increased, and the strength of the primary containment vessel must be increased with a view to increasing a seismic strength.

Either of the above measures results in an increased strength of the primary containment vessel, and the structure needs to be increased in strength, for example, by increasing the thickness of the wall of the containment vessel, and therefore the cost of the plant is increased.

SUMMARY OF THE INVENTION

With the above problems in view, it is a primary object of this invention to provide a cooling system for a primary containment vessel in a nuclear power plant which system utilizes a condenser-type heat removal system, in which uncondensed steam discharged to a suppression pool is prevented from making only a surface layer of the water of the suppression pool hot, and the pool water can be sufficiently used as a heat absorption source by uniforming the suppression pool temperature, and the pressure within the primary containment vessel at the time of an accident is reduced, thereby enhancing a reliability thereof, and a design strength of the primary containment vessel can be reduced.

Another object of the invention is to provide a component part used in such a cooling system.

To achieve the primary object of the invention, according to a first aspect of the invention, there is provided a cooling system for a primary containment vessel in a nuclear power plant which system includes a gas vent which extends from a heat exchanger of a condenser-type heat removal system into water of a suppression pool water to be communicated with the water of the suppression pool; wherein means for discharging a vent fluid in a dispersing manner is mounted on a portion of the gas vent disposed in the water of the suppression pool.

According to a second aspect of the invention, there is provided a cooling system for a primary containment vessel in a nuclear power plant which system includes a gas vent which extends from a heat exchanger of a condenser-type heat removal system into water of a suppression pool to be communicated with the water of the suppression pool; wherein means for forming a gas-to-liquid contact surface at which a vent fluid and the water of the suppression pool are contacted with each other is mounted on that portion of the gas vent disposed in the water of the suppression pool to extend horizontally.

According to a third aspect of the invention, there is provided a cooling system for a primary containment vessel in a nuclear power plant which system includes a gas vent which extends from a heat exchanger of a condenser-type heat removal system into water of a suppression pool to be communicated with the water of the suppression pool; wherein means for restraining upward movement of a vent fluid is provided on a portion of the gas vent disposed in the water of the suppression pool to extend horizontally to an extent greater than a flow area of the gas vent, the restraining means including communication holes communicated with the water of the suppression pool and disposed below a level where a maximum gas-to-liquid contact area is formed, and the communication holes being distributed over a range larger than the flow area of the gas vent.

According to a fourth aspect of the invention, there is provided a cooling system according to the third aspect, in which the restraining means comprises horizontal pipes connected to and communicated with the gas vent in a plurality of directions, each of the pipes having a closed distal end, and each of the pipes having openings which are in free communication with the suppression pool, and are disposed below a horizontal plane in which axes of the pipes lie.

According to a fifth aspect of the invention, there is provided a cooling system according to the third aspect, in which the restraining means comprises a baffle or baffles extending generally horizontally from an outer periphery of the gas vent with an outer peripheral edge portion thereof directed generally downwardly.

According to a sixth aspect of the invention, there is provided a cooling system according to the fifth aspect, in which the baffles are mounted on the outer periphery of the gas vent in a multi-stage manner in a vertical direction, and the higher the level of said baffles the larger the extent thereof.

According to a seventh aspect of the invention, there is provided a cooling system for a primary containment vessel in a nuclear power plant which system includes a gas vent which extends from a heat exchanger of a condenser-type heat removal system into water of a suppression pool to be communicated with the water of the suppression pool; wherein a plurality of horizontal pipes are connected to and communicated with a portion of the gas vent, which is disposed in the water of the suppression pool, in a plurality of different directions, each of the pipes having a plurality of openings which are in communication with the water of the suppression pool to be arranged in a dispersed manner below a horizontal plane in which axes of the pipes lie, and a portion of each of the pipes disposed above the horizontal plane being closed.

To achieve another object of the invention, according to an eighth aspect of the invention, there is provided a gas vent pipe comprising a main pipe portion, and a plurality of horizontal pipes provided on a lower end portion or a portion near said lower end portion of said main pipe portion in communication therewith in different directions, said each horizontal pipes having a plurality of dispersedly distributed opening at a portion thereof below a horizontal plane which includes therein axes of said horizontal pipes, said each horizontal pipes being closed at a portion thereof above said horizontal plane.

According to a ninth aspect of the invention, there is provided a gas vent pipe comprising a baffle or baffles provided on a lower end portion or a portion near said lower end portion of said gas vent pipe, said baffle or baffles being lowered at the outwardly extending edge or edges thereof.

According to a tenth aspect of the invention, there is provided a gas vent pipe comprising a plurality of baffles provided vertically in a multi-stage manner on a lower end portion or a portion near said lower end portion of said gas vent pipe, said baffle or baffles being lowered at the outwardly extending edge or edges thereof, and the higher the level of said baffles the larger the extent of the outwardly extending edge or edges of said baffle or baffles.

To achieve the primary object of the invention, according to an eleventh aspect of the invention, there is provided a cooling system for a primary containment vessel in a nuclear power plant, comprising:

a pressure boundary;

a reactor pressure vessel containing a core;

a drywell in which the reactor pressure vessel is mounted;

a suppression pool separated from the drywell by a partition wall;

a vent tube for communicating the drywell with water of the suppression pool;

a pool disposed at a level above the core;

an injection pipe for communicating water of the pool via a check valve to a portion of reactor pressure vessel disposed at a level below the pool; the reactor pressure vessel, the drywell, the suppression pool, the vent tube, the pool, and the injection pipe being provided within the pressure boundary;

a cooling water pool provided outside the pressure boundary and pool having an exhaust passage leading to the atmosphere;

a heat exchanger of a condenser-type heat removal system provided in water of the cooling water pool;

a pipe for introducing the atmosphere of the drywell into the heat exchanger at the time of an accident;

a return line of condensate produced in the heat exchanger, to the pool;

a gas vent pipe for discharging an uncondensed fluid from the heat exchanger into the water of the suppression pool at a level above a discharge port of said vent tube; and means mounted on a portion of the gas vent pipe disposed in the water of the suppression pool for restraining upward movement of the uncondensed fluid, the restraining means being extended horizontally to an extent greater than a flow area of the gas vent pipe, the restraining means including communication holes communicated with the water of the suppression pool, the communication holes being disposed below a level, at which a maximum gas-to-liquid contact area is formed, and the communication holes being distributed over a range wider than the flow area of the gas vent pipe.

According to a twelfth aspect of the invention, there is provided a cooling system according to the eleventh aspect, in which there is provided an additional heat exchanger for cooling the water of the suppression pool at a region of the water where the gas vent pipe is submerged.

According to a thirteenth aspect of the invention, there is provided a cooling system according to the twelfth aspect, in which the range of cooling effected by the additional heat exchanger is extended to the wetwell disposed above the surface of the water of the suppression pool.

According to a fourteenth aspect of the invention, there is provided a cooling system for a primary containment vessel in a nuclear power plant which system includes a gas vent extending from a heat exchanger of a condenser-type heat removal system into a suppression pool; wherein cooling means is provided in the suppression pool for cooling the water of the suppression pool at a region of the water where the gas vent is submerged.

According to a fifteenth aspect of the invention, there is provided a cooling system according to the fourteenth aspect, in which the range of cooling effected by the cooling means is extended to a wetwell disposed above the surface of the water of the suppression pool.

According to a sixteenth aspect of the invention, there is provided a cooling system according to the fourteenth aspect or the fifteenth aspect, in which the cooling means comprises a heat exchanger, cooling water which receives heat from said heat exchanger, and a cooling water pool containing therein said cooling water and having a exhaust pipe communicating with the atmosphere.

According to a seventeenth aspect of the invention, there is provided a cooling system according to the fourteenth aspect, the fifteenth aspect or the sixteenth aspect, in which the gas vent is constituted by the gas vent pipe of the eighth aspect, the ninth aspect or the tenth aspect.

According to the first aspect, uncondensed steam flows from the heat exchanger through the gas vent to be discharged into the suppression pool from the dispersingly-discharging means. The dispersingly-discharging means is mounted horizontally, and therefore at the time of this discharge, the extent of dispersing of the discharged fluid is enlarged horizontally, so that the region where the water of the suppression pool is mixed with the uncondensed steam is enlarged. Even if the outlet of the gas vent extending from the heat exchanger is disposed in the water of the suppression pool, the temperature of the water surface of the suppression pool can be lowered, so that the pressure within the primary containment vessel is decreased.

According to the second aspect, uncondensed steam from the heat exchanger is blown through the gas vent into the gas-to-liquid contact surface forming means. In this gas-to-liquid contact surface forming means, the gas phase of the uncondensed steam is contacted with the liquid phase (or the water of the suppression pool in the gas-to-liquid contact surface forming means) at a horizontally-extending gas-to-liquid contact surface, and the uncondensed steam is subjected to promoted condensation to be discharged into the water of the suppression pool. Furthermore, the heat is released from the gas-to-liquid contact surface forming means to the water of the suppression pool on the outer side and with this heat releasing effect, the fluid lowered in temperature is discharged from the gas-to-liquid contact surface forming means into the water of the suppression pool. With this arrangement, even if the outlet of the gas vent extending from the heat exchanger is extended in the water of the suppression pool, the temperature of the water surface of the suppression pool can be lowered, so that the pressure within the primary containment vessel is decreased.

According to the third aspect, uncondensed steam fed from the heat exchanger through the gas vent is caught by the horizontally-extending means for restraining upward movement of a vent fluid, and is contacted with the liquid phase (or the water of the suppression pool) at the gas-to-liquid contact surface in the restraining means, so that the uncondensed steam is condensed. Furthermore, the heat is released from the restraining means to the water of the suppression pool on the outer side of this restraining means, and with this heat releasing effect, the fluid lowered in temperature is discharged from the restraining means into the water of the suppression pool over a wide range. With this arrangement, even if the outlet of the gas vent extending from the heat exchanger is extended in the water of the suppression pool, the temperature of the water surface of the suppression pool can be lowered, so that the pressure within the primary containment vessel is decreased.

According to the fourth aspect, in addition to the effects of the third aspect, uncondensed steam enter the horizontal pipes from the gas vent. Each of the horizontal pipes has the openings which are in communication with the water of the suppression pool and are disposed below the horizontal plane in which the axes of the pipes lie. Therefore, the uncondensed steam is caught as a gas phase in an upper portion of the interior of each pipe disposed above the above-mentioned horizontal plane, and therefore is prevented from upward movement, while the water of the suppression pool is present as a liquid phase in a lower portion of the interior of the pipe below the above horizontal plane. In each of the horizontal pipes, the uncondensed steam is contacted with the water of the suppression pool to be condensed, and besides is lowered in temperature by the release of heat from each horizontal pipe to the exterior thereof. The condensed steam (condensate) is discharged as cold (low-temperature) liquid into the water of the suppression pool through the openings over a wide range. With this arrangement, even if the outlet of the gas vent extending from the heat exchanger is extended in the water of the suppression pool, the temperature of the water surface of the suppression pool can be lowered, so that the pressure within the primary containment vessel is decreased.

According to the fifth aspect, in addition to the effects of the third aspect, the uncondensed steam discharged from the gas vent is restrained by the baffle from upward movement in the suppression pool, and is condensed through the gas-to-liquid contact to be lowered in temperature. The condensed fluid turns around the outer peripheral edge of the baffle to be dispersed into the suppression pool. With this arrangement, even if the outlet of the gas vent extending from the heat exchanger is extended in the water of the suppression pool, the temperature of the water surface of the suppression pool can be lowered, so that the pressure within the primary containment vessel is decreased.

According to the sixth aspect, the effect achieved by the fifth aspect is repeated several times until the uncondensed steam reaches the water surface of the suppression pool.

According to the seventh aspect, uncondensed steam enters each of the horizontal pipes from the gas vent. Each of the horizontal pipes has the openings which are in communication with the water of the suppression pool and are disposed below the horizontal plane in which the axes of the pipes lie. Therefore, the uncondensed steam is caught as a gas phase in an upper portion of the interior of each pipe disposed above the above-mentioned horizontal plane, and therefore is prevented from upward movement, while the water of the suppression pool is present as a liquid phase in a lower portion of the interior of the pipe below the above horizontal plane. In each of the horizontal pipes, the uncondensed steam is contacted with the water of the suppression pool to be condensed, and besides is lowered in temperature by the release of heat from each horizontal pipe to the exterior thereof. The condensed steam (condensate) is dispersingly discharged as cold (low-temperature) liquid into the water of the suppression pool through the openings over a wide range. With this arrangement, even if the outlet of the gas vent extending from the heat exchanger is extended in the water of the suppression pool, the temperature of the water surface of the suppression pool can be lowered, so that the pressure within the primary containment vessel is decreased.

According to the eighth aspect, the fluid to be condensed, such as steam gas, which has flowed through the gas vent pipe, is caught in an upper portion of the interior of each horizontal pipe disposed above the horizontal plane in which the axes of the horizontal pipes lie. This uncondensed fluid is contacted with the water of the suppression pool disposed at a lower portion of the interior of each horizontal pipe, so that the uncondensed fluid is subjected to promoted condensation. Furthermore, the condensation of the fluid is promoted by the release of heat from the horizontal pipe to the exterior thereof. The fluid thus condensed and lowered in temperature is dispersingly discharged into the water of the suppression pool from the openings.

According to the ninth aspect, the fluid to be condensed, such as steam gas, which has flowed through the gas vent pipe, is discharged from the gas vent pipe, and is restrained by the baffle from upward movement in the suppression pool. The uncondensed steam is condensed through gas-to-liquid contact to be lowered in temperature. The condensed fluid turns around the outer peripheral edge of the baffle to be dispersed into the water of the suppression pool.

According to the tenth aspect, the effect achieved by the ninth aspect is repeated several times until the uncondensed steam reaches the water surface of the suppression pool.

According to the eleventh aspect, when steam within the reactor pressure vessel, produced as a result of heating water by the core, is discharged into the drywell because of an accident, the pressure within the drywell increases abruptly, so that the thus discharged steam is blown into the suppression pool through the vent tube to be condensed. At the same time, the discharged steam is introduced into the heat exchanger through the pipe to be condensed. The condensate in the heat exchanger flows into the pool through a return line of condensate, and this condensate in this pool is injected through the injection pipe into the reactor pressure vessel by the gravity force. Thus, the condensate is reused as cooling water for the core. The uncondensed steam in the heat exchanger flows, as part of the uncondensed fluid, through the gas vent, and is discharged into the suppression pool. The uncondensed steam is caught by and restrained by the upward movement restraining means from upward movement, and is subjected to promoted condensation through the gas-to-liquid contact with the water of the suppression pool and also through the release of heat from the upward movement restraining means. Then, the condensed steam is dispersed into the water of the suppression pool over a range larger than the flow area of the gas vent to be mixed with the water of the suppression pool over a wide range. With this arrangement, even if the outlet of the gas vent extending from the heat exchanger is extended in the water of the suppression pool, the temperature of the water surface of the suppression pool can be lowered, so that the pressure within the primary containment vessel is decreased. With the lapse of time after an accident initiation, when the pressure difference between the drywell and the wetwell becomes small, the discharge from the vent tube whose outlet is disposed at a greater depth of water is stopped, while the discharge into the suppression pool from the gas vent whose outlet is disposed at a smaller depth of water continues. As a result, the cooling function as well as the suppression function is maintained for a long period of time after the accident.

According to the twelfth aspect, in addition to the effects of the eleventh aspect, the water of the suppression pool is cooled by the heat exchanger, and is caused to flow downward to produce a convection in the water of the suppression pool. As a result, the heat is dissipated into the water of the suppression pool over the entire region thereof, and the cooling function as well as the suppression function is maintained more effectively for a prolonged period of time after the accident.

According to the thirteenth aspect, in addition to the effects of the twelfth aspect, the wetwell can also be cooled directly, and therefore the cooling function as well as the suppression function is maintained still more effectively for a long period of time after the accident.

According to the fourteenth aspect, the uncondensed steam discharged, from the heat exchanger through the gas vent into the suppression pool, is condensed by the water of the suppression pool, and tends to be stagnant at the surface of the water of the suppression pool such that the water at this water surface is higher in temperature than the remainder of this pool water; however, such high-temperature water is cooled by the cooling means to form a downward flow to produce a convection in the water of the suppression pool. With this convection, even if the outlet of the gas vent extending from the heat exchanger is disposed in the water of the suppression pool, the temperature of the water surface of the suppression pool can be lowered, so that the pressure within the primary containment vessel is decreased.

According to the fifteenth aspect, in addition to the effects of the fourteenth aspect, the wetwell can also be cooled directly, and therefore even if the outlet of the gas vent extending from the heat exchanger is extended in the water of the suppression pool, the temperature of the water surface of the suppression pool can be further lowered, so that the pressure within the primary containment vessel is further decreased.

According to the sixteenth aspect, in addition to the effects of the fourteenth aspect and the fifteenth aspect, the heat, received in the heat exchanger as a result of cooling the water of the suppression pool, is released to the cooling water pool. This heat is released by the evaporation of the cooling water, and the resulting steam is discharged to the atmosphere through the exhaust pipe. Therefore, a pressure increase of the cooling water pool can also be suppressed.

According to the seventeenth aspect, in addition to the effects of the fourteenth aspect, the fifteenth aspect and the sixteenth aspect, the effects of the eighth aspect, the ninth aspect and the tenth aspect are added.

DESCRIPTION OF THE PREFERRED EMBODIMENTS

A first embodiment of the present invention will now be described.

Figure 1:
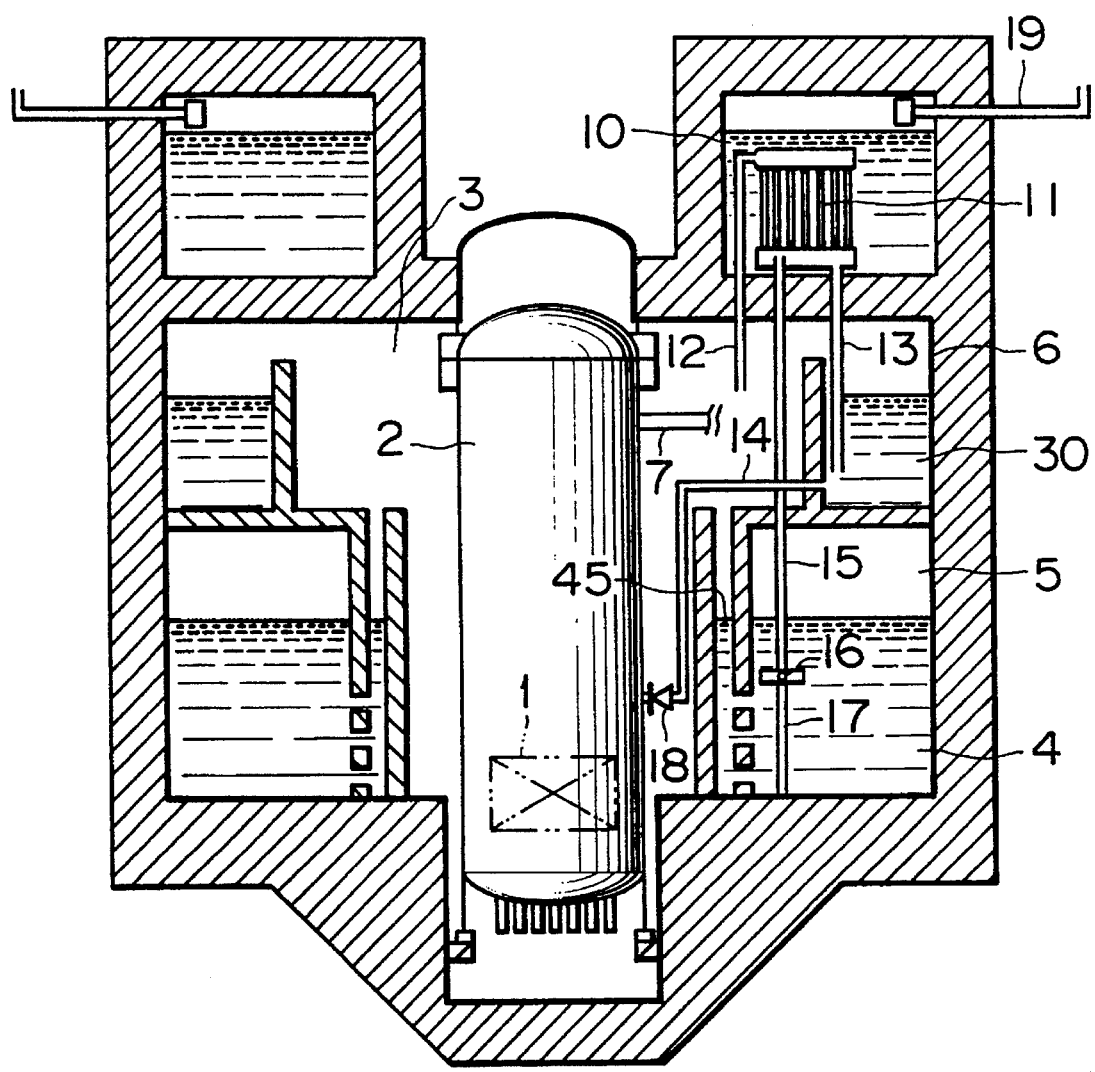
FIG. 1 is a vertical cross-sectional view of a first embodiment of a primary containment vessel of the present invention.

As shown in FIG. 1, a nuclear power plant to which the present invention is applied includes a core 1 composed of a fuel assembly, a reactor pressure vessel 2 containing the core 1, a drywell 3 surrounding the reactor pressure vessel 2, a suppression pool 4 which is disposed around an outer periphery of the reactor pressure vessel 2 and is connected to the drywell 3 via a vent tube 45, and a wetwell (gas-phase space) 5 defined by an upper portion of the suppression pool 4. All of these parts and portions are provided within a pressure boundary 6 (indicated in a thick solid line in FIG. 1) of a primary containment vessel.

The pressure boundary 6 is mostly formed by mounting an iron plate on a concrete wall, and the surface of this iron plate serves as a pressure boundary surface.

A cooling water pool 10 is provided above and outside the pressure boundary 6, and a heat exchanger 11 is provided and immersed in the water of the cooling water pool 10.

A gas-phase space of the cooling water pool 10 is connected to the atmosphere via an exhaust pipe 19.

An inlet side (an upper header in FIG. 1) of the heat exchanger 11 is communicated with the drywell 3 by a pipe 12 extending through the pressure boundary 6 of the primary containment vessel. A liquid-phase portion on an outlet side (a lower header in FIG. 1) of the heat exchanger 11 is communicated with water in a pool 30 within the primary containment vessel by a return line 13 of condensate extending into this pool water. A gas-phase portion on the outlet side (the lower header) of the heat exchanger 11 is communicated with the water of the suppression pool 4 by a gas vent pipe 15 extending into this pool water.

The water in the pool 30 within the primary containment vessel is connected to the interior of the reactor pressure vessel 2 by an injection pipe 14 via a check valve 18.

Horizontally-disposed pipes (branch pipes) 16 are mounted on an outlet portion of the gas vent pipe (main pipe) 15 disposed in the water of the suppression pool 4, the pipes 16 being in communication with the gas vent pipe 15. The gas vent pipe 15 and the pipes 16 are supported in the water of the suppression pool 4 from the lower side by a structural member 17.

Figure 2:
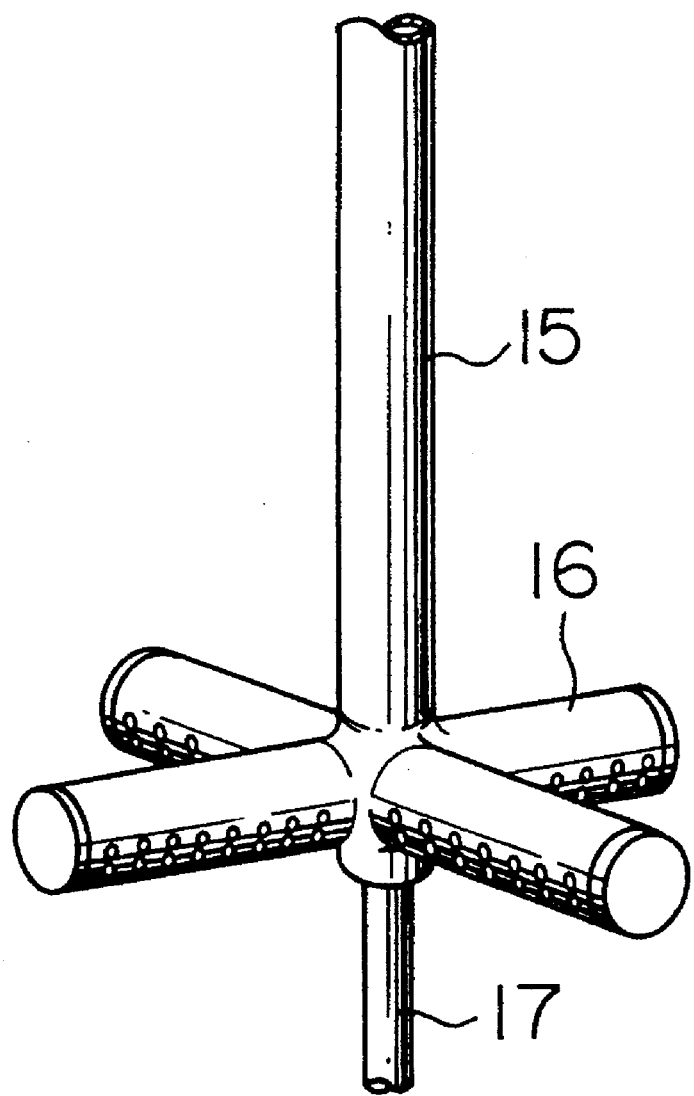
FIG. 2 is a perspective view of an outlet portion of a gas vent pipe of the primary containment vessel of FIG. 1.
Figure 3:
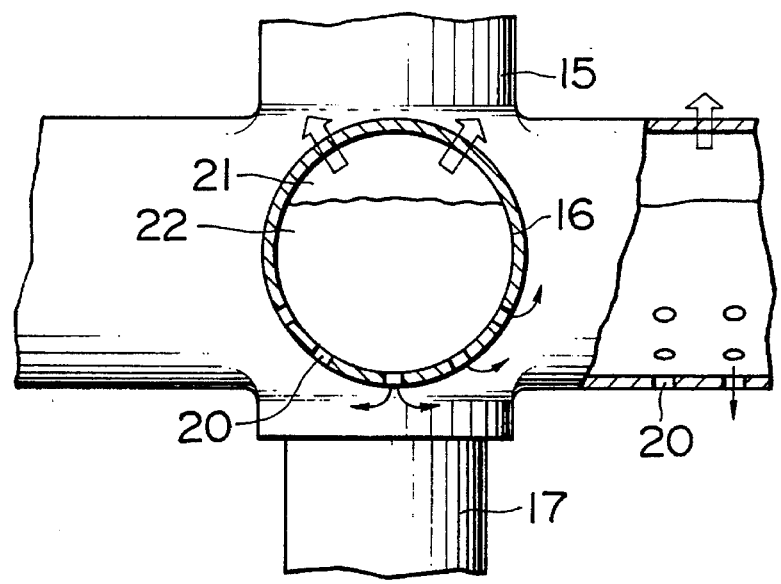
FIG. 3 is a cross-sectional view of the outlet portion of the gas vent pipe shown in FIG. 1.

As shown in FIGS. 2 and 3, each of the horizontal pipes 16 mounted on the outlet portion of the gas vent pipe 15 has a plurality of openings or holes 20 disposed below a horizontal plane in which the axes of the pipes 16 lie, the openings 20 being directed generally downwardly from a horizontal plane. The free or distal ends of the pipes 16 remote from the gas vent pipe 15 are closed.

In the event of a loss of coolant accident, which must be taken into consideration in designing the primary containment vessel, such as a break in a main steam line (MSL) 7 for feeding steam, produced in the reactor pressure vessel 2, to a turbine (not shown), the steam of high temperature and high pressure, flowed into the drywell 3 through a break, flows, together with a noncondensable gas which fills the drywell 3 during a normal operation into the heat exchanger 11 via the pipe 12 except during a short period of time immediately after the initiation of the accident.

This is because the submergence of the gas vent pipe 15 is smaller than that of the vent tube 45, so that a static head exerted on the outlet of the gas vent pipe 15 is made small.

During a short period of time immediately after the initiation of the accident, a large amount of steam instantaneously flows through a break into the drywell 3 to increase the pressure within the drywell 3. As a result, the pressure in the drywells 3 overcomes the static heads of the gas vent pipe 15 and the vent tube 45, and therefore the steam and the noncondensable gas separately flow into the suppression pool 4 via both of the gas vent pipe 15 and the vent tube 45, so that the steam is condensed, thereby preventing an excessive pressure increase.

With the lapse of time after the accident, the pressure within the drywell 3 decreases, and the steam and the noncondensable gas cease to flow into the suppression pool 4 via the vent tube 45 whose submergence is deeper while the flow into the suppression pool 4 via the gas vent pipe 15 whose submergence is shallower continues. Therefore, the cooling within the primary containment vessel, as well as the suppression of the pressure increase within the primary containment vessel, is continued.

Thus, the cooling and the suppression of the pressure within the primary containment vessel are achieved for a long period of time, thereby securing the safety.

The amount of flow into the suppression pool 4 via the gas vent pipe 15 is smaller with the lapse of this initial time period after the accident than during the initial time period after the accident, and besides since the submergence of the gas vent pipe 15 is shallower, convection over the entire region in the suppression pool 4 can not be expected so much.

Because of a temperature difference between the gas of mixture of the steam and the noncondensable gas, flowing into the heat exchanger 11 from the drywell 3, and the water of the cooling water pool 10, the heat of this mixture gas is released into the water of the cooling water pool 10, so that the steam in this mixture gas is condensed.

The heat transferred to the cooling water pool 10 is discharged, through the evaporation of the water of the pool 10, to the atmosphere via the exhaust pipe 19, thus removing decay heat produced at the core 1 at the time of the accident and discharged into the primary containment vessel.

On the other hand, the condensate in the heat exchanger 11 flows downward therefrom through the return line 13 of condensation connected to a lowermost portion of the outlet-side header, and is returned to the pool 30 in the primary containment vessel, and then is injected into the reactor pressure vessel 2 via the injection pipe 14. The core 1 is cooled by this injection of water.

The steam having not been condensed by the heat exchanger 11 mainly because of the degradation of the condensation capability due to the presence of the noncondensable gas, flows, together with the noncondensable gas, into the suppression pool 4 via the gas vent pipe 15 to be condensed there.

At this time, the behavior of the condensation of the steam flowing into the suppression pool 4, as well as the behavior of the hot (high-temperature) water produced by the condensation are as follows because of the provision of the horizontally-disposed pipes 16 mounted on the outlet portion of the gas vent pipe 15.

The horizontal pipes 16 mounted on the outlet portion of the gas vent pipe 15 have the openings 20 which are disposed below a horizontal plane in which the axes of the pipes 16 lie, and are directed generally downwardly from the horizontal plane. Therefore, the uncondensed steam 21 having flowed downward along the gas vent pipe 15 stagnates at an upper portion of each pipe 16 as shown in FIG. 3, and is condensed upon contact and mixing with the water in the suppression pool 4.

Hot water 22 produced as a result of this condensation spreads in the horizontal pipes 16, and flows into the bulk of the suppression pool 4 through the plurality of generally downwardly-directed openings 20.

Heat is transferred from the steam and the hot water, stagnating and spreading in the horizontal pipes 16, to the bulk of the suppression pool 4 through an upper portion of a peripheral wall of each pipe 16, as shown by white arrows in FIG. 3.

Figure 4:
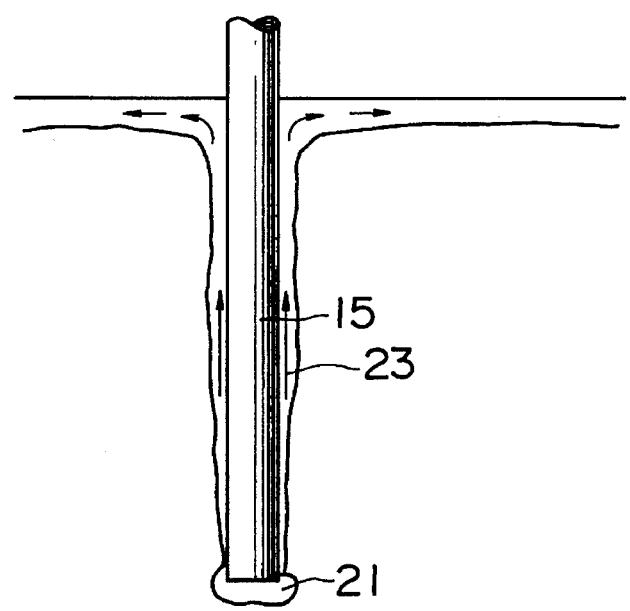
FIG. 4 is a schematic view showing a flow pattern in a suppression pool of the prior art.

In the case of the prior art arrangement with no horizontal pipe 16, uncondensed steam 21 spreads only in the vicinity of an outlet of the gas vent pipe 15, and is contacted and mixed with the water of the suppression pool 4, as shown in FIG. 4 as described in the above-mentioned literature.

In such prior art arrangement, the condensation occurs at a narrow region, and since an amount of mixture of the uncondensed steam with the low-temperature water of the suppression pool 4 is small, the temperature at this narrow region becomes relatively high. Moreover, since a relatively small amount of water thus becomes high in temperature, the buoyancy also increases, and the thus-produced relatively hot water 23 moves upward to spread over the surface of the water of the suppression pool 4 while forming a thin thermal boundary layer around the gas vent pipe 15. At this time, the hot water moves upward at a relatively high speed while forming the thermal boundary layer, and therefore the hot water is not so much mixed with the bulk in the suppression pool 4, and the hot water, while kept at high temperatures, reaches the surface of the water of the suppression pool 4, and then spreads.

According to the theory of a thermal boundary layer, the thickness of the thermal boundary layer extending upwardly along the gas vent pipe 15 is increasing generally progressively from the outlet of the gas vent pipe 15 toward the surface of the water of the suppression pool 4; however, this thickness as measured from the outer peripheral surface of the gas vent pipe 15 is about 10–15 cm at best even at the surface portion of the water of the suppression pool 4.

In contrast, in the present invention, because of the provision of the horizontally-disposed pipes 16 having only the openings 20 directed generally downwardly from a horizontal plane, the region where the uncondensed steam 21 is contacted and mixed with the pool water spreads horizontally in the pipes 16 throughout the length thereof, as described above. If the length of the pipes 16 is made longer than the thickness of the above thermal boundary layer, the above contact/mixing region is positively expanded.

Thanks to this effect, an amount of the water of the suppression pool 4 mixed with the uncondensed steam is increased, and this effect cooperates with the effect of heat transfer through the upper portions of the peripheral walls of the pipes 16 to lower the temperature of the hot water to be produced. The hot water thus produced passes through the plurality of openings 20 in the pipes 16, and is dispersed generally horizontally into the bulk of the suppression pool 4.

Because of these effects, the hot water spreads over a wide region, without forming a thin thermal boundary layer along the gas vent pipe 15, to have a relatively small temperature difference between it and the surrounding bulk. As a result, the hot water of a relatively large volume whose buoyancy is small per unit volume moves upward at a relatively low speed in the bulk of the suppression pool 4. At this time, the speed of the upward movement is low, and also the region where the hot water moves upward is large, and therefore the mixing of the hot water with the bulk is promoted, so that the temperature of the pool water is made uniform, and also the water reaching the surface of the pool water is lowered in temperature.

The pressure within the primary containment vessel at the time of a loss of coolant accident is determined in accordance with the pressure of the wetwell (gas-phase space) 5 which is the sum of the partial pressure of the noncondensable gas and the steam partial pressure in the wetwell 5.

Figure 5A:
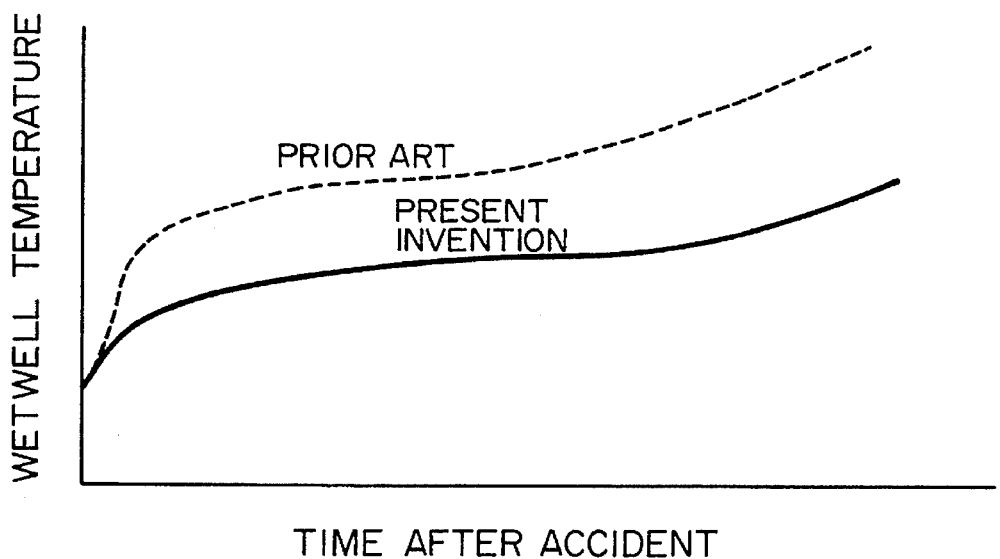
FIG. 5A is a graph showing a comparison between the first embodiment and the prior art of FIG. 4 with respect to the relation between the temperature of a wetwell and the lapse of time after the initiation of an accident.
Figure 5B:
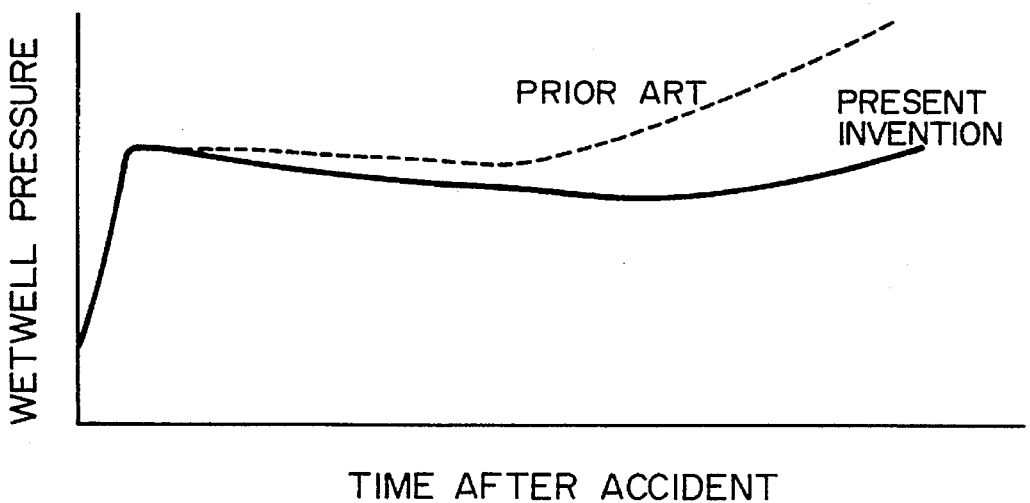
FIG. 5B is a graph showing a comparison between the first embodiment and the prior art of FIG. 4 with respect to the relation between the pressure of the wetwell and the lapse of time after the initiation of the accident.

For the purpose of comparing the above prior art technique with the present invention, a change of the wetwell temperature with time is diagrammatically shown in FIG. 5A, and a change of the wetwell pressure with time is diagrammatically shown in FIG. 5B, the wetwell temperature and the wetwell pressure being determined according to the temperature of the surface of the water in the suppression pool 4.

In FIGS. 5A and 5B, the abscissa axis represents the time after the accident. By way of a comparison between the prior art technique and the present invention, FIG. 5A shows the temperature of the wetwell, and FIG. 5B shows the pressure of the wetwell. The broken lines represent the prior art technique, and the solid lines represent the present invention.

In this embodiment, the mixing of the uncondensed steam with the pool water is sufficiently effected as described above, so that the temperature of the water of the suppression pool 4 is made uniform. As compared with the prior art technique in which the temperature only of the pool surface is high, the temperature of the surface of the water of the suppression pool 4 is lower in the present invention, and therefore the temperature of the wetwell 5 determined by this pool surface temperature is also low.

The steam partial pressure within the wetwell 5 is a saturated pressure for the temperature within the wetwell 5. Therefore, the lower the temperature is, the lower the steam partial pressure is. As a result, the pressure within the wetwell 5 is lower in the present invention than in the prior art technique, and therefore the pressure within the primary containment vessel in the present invention is also lower.

The difference in saturated steam partial pressure for the temperature difference markedly increases above 100° C. Therefore, the pressure difference becomes conspicuous after a long period of time has elapsed since the accident when the temperature within the wetwell 5 is above 100° C.

Namely, in this embodiment, the heat absorption capability is effectively utilized over a wide region of the water in the suppression pool 4, so that the pressure within the primary containment vessel at the time of the loss of coolant accident can be suppressed within a low level for a long period of time.

In the embodiment shown in FIG. 1, the inlet-side pipe 12 of the heat exchanger 11 immersed in the water in the cooling water pool 10 disposed above and outside the pressure boundary 6 may be connected the main steam line 7 via an isolation valve instead of being opened to the drywell 3. In this case, this isolation valve is held in a closed condition during the normal operation, and is opened in response to an accident initiation signal such as a signal representative of a lowered water level in the reactor pressure vessel 2 or a signal representative of an increased pressure level of the primary containment vessel. With this system, effects similar to the above effects can also be achieved, and the pressure within the primary containment vessel at the time of the loss of coolant accident can be suppressed within a low level for a prolonged period of time.

A second embodiment of the present invention will now be described with reference to FIGS. 6 and 7.

Figure 6:
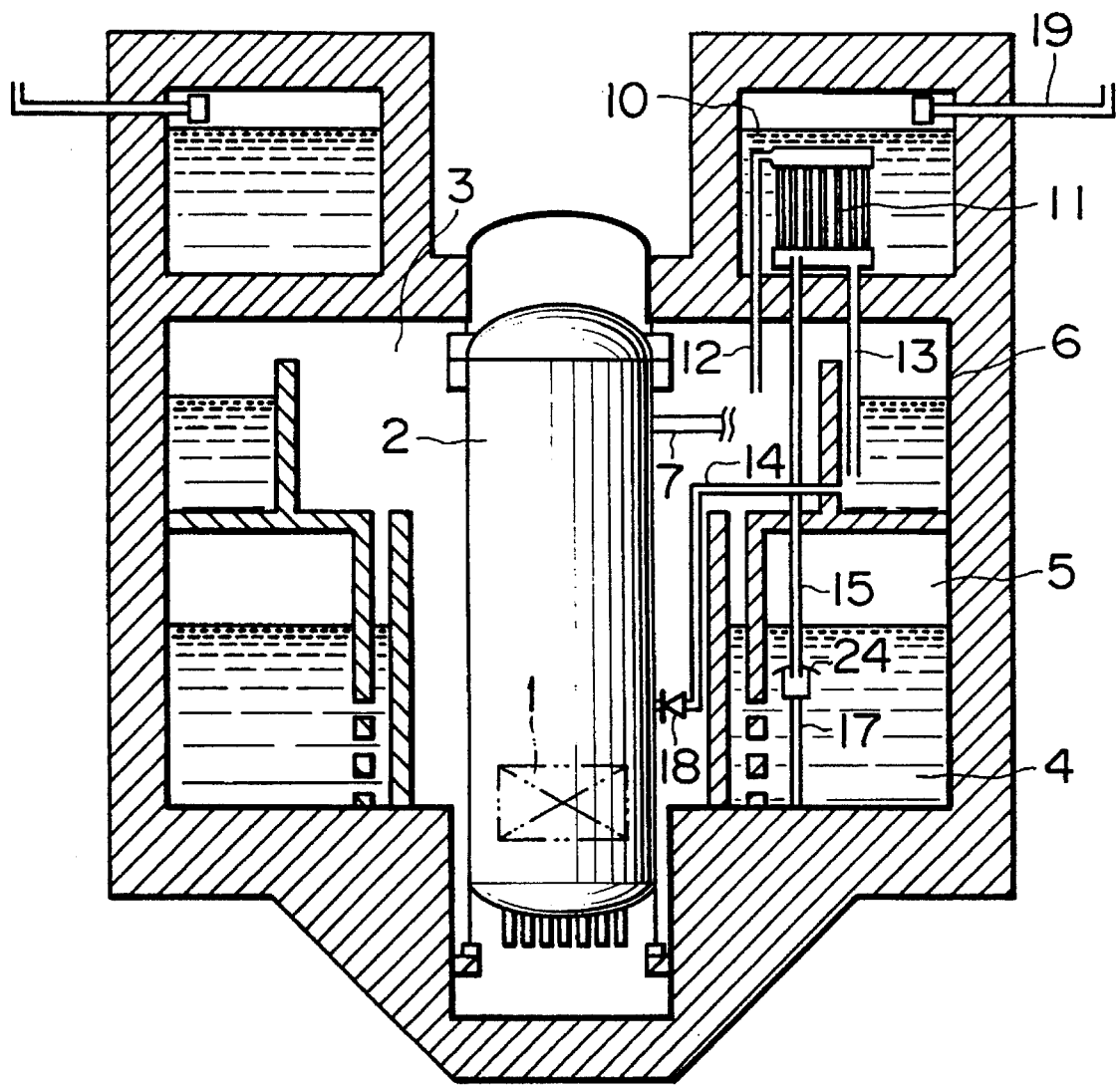
FIG. 6 is a vertical cross-sectional view of a second embodiment of a primary containment vessel of the present invention.

The second embodiment of FIG. 6 differs from the first embodiment of FIG. 1 in that an outlet portion of a gas vent pipe 15 extending into water of a suppression pool 4 from a heat exchanger 11 immersed in water of a cooling water pool 10 provided above and outside a boundary layer 6 of a primary containment vessel has a different configuration.

Figure 7:
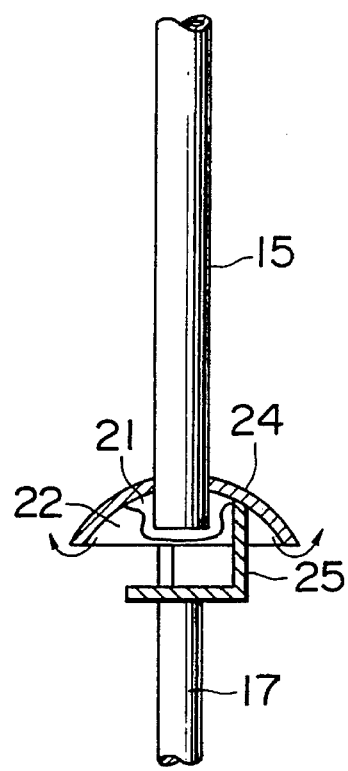
FIG. 7 is a vertical cross-sectional view of an outlet portion of a gas vent pipe of the primary containment vessel of FIG. 6.

More specifically, in this embodiment, an upwardly-convex cover 24 is mounted on the gas vent pipe 15 to be disposed above the outlet of the gas vent pipe 15 in surrounding relation to the entire outer periphery of the gas vent pipe 15, as shown in FIG. 7, said outlet of the gas vent pipe 15 being disposed in the water of the suppression pool 4. The cover 24 is extended generally radially outwardly, that is, generally horizontally, from the gas vent pipe 15 so as to intercept an upward flow.

The dimension of the cover 24 as measured in a horizontal direction from the outer periphery of the gas vent pipe 15 is larger than the thickness of the above-mentioned thermal boundary layer which is formed along the gas vent pipe 15 to have a maximum thickness of about 10–15 cm.

The cover 24 is supported on a structural member 17, which is connected to the bottom of the suppression pool 4, through a structural member 25 connected to the cover 24. The other construction of this embodiment is the same as that of the first embodiment, and therefore explanation thereof is omitted.

Uncondensed steam 21 discharged from the gas vent pipe 15 at the time of an accident first moves upward slightly, and then is intercepted by the cover 24 to be spread horizontally, and is contacted and mixed with the bulk in the suppression pool 4, and therefore is condensed.

At this time, the above-mentioned horizontal dimension (radial length) of the cover 24 is larger than the thickness of the thermal boundary layer which will turn into an upward flow, so that such upward flow cannot rise without being intercepted by the cover 24.

Hot water produced as a result of condensation spreads horizontally beneath the cover 24, and is mixed with the bulk, and then moves around the outer peripheral edge of the cover 24 to rise in the bulk.

Heat is released from the uncondensed steam and the condensation, which stagnate under the cover 24, to the bulk through the cover 24.

Owing to these effects, the mixing of the discharged, uncondensed steam with the pool water is effected horizontally over a wide range, thereby uniforming the temperature of the pool water. As a result, as compared with the above prior art technique, a temperature rise of the surface of the water of the suppression pool 4 is further suppressed, so that the pressure within the primary containment vessel can be suppressed for a long period of time.

Figure 8:
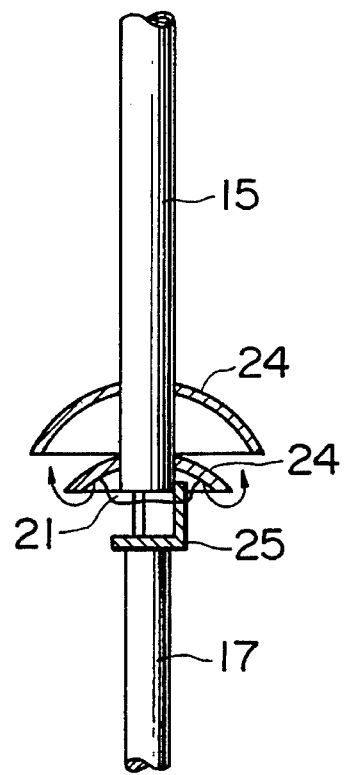
FIG. 8 is a vertical cross-sectional view of a modified gas vent pipe according to a third embodiment of the present invention.

FIG. 8 shows a third embodiment of the invention in which a plurality of covers 24 are mounted on a gas vent pipe 15 in a multi-stage manner along the length of the gas vent pipe 15 to be disposed above an outlet of the gas vent pipe 15. The horizontal dimension (radial length) of the covers 24 is increasingly enlarged as they are disposed more upward. The other construction of this embodiment is the same as that of the first embodiment, and therefore explanation thereof is omitted.

In this embodiment, hot water is intercepted by the lower cover 24 to spread horizontally, and is mixed with the bulk in the suppression pool 4, and then moves around the outer peripheral edge of the lower cover 24 to rise. Then, the hot water is intercepted by the upper cover 24, and is mixed with the bulk.

By thus providing the covers 24 in a multistage manner, a period of time, during which the hot water moving upward stagnates in the bulk can be prolonged, so that the mixing of uncondensed steam, discharged from the gas vent pipe 15, with the bulk in the suppression pool 4 is promoted, thereby positively uniforming the temperature of the pool water.

A fourth embodiment of the invention will now be described with reference to FIG. 9.

In this embodiment, while an outlet of a gas vent pipe 15 is similar in configuration to that of the prior art technique, a cooling water pool 31 is mounted outside a pressure boundary 6 of a primary containment vessel to be disposed at the side of a suppression pool 4. A heat exchanger 32 is immersed in the cooling water pool 31, and is connected to the water in the suppression pool 4 by a group of horizontally-disposed pipes 33 which are consecutively arranged in a multi-stage manner to be disposed over a vertical range where the gas vent pipe 15 is immersed in the suppression pool 4. The other construction of this embodiment is the same as that of the first embodiment, and therefore explanation thereof is omitted.

Figure 9:
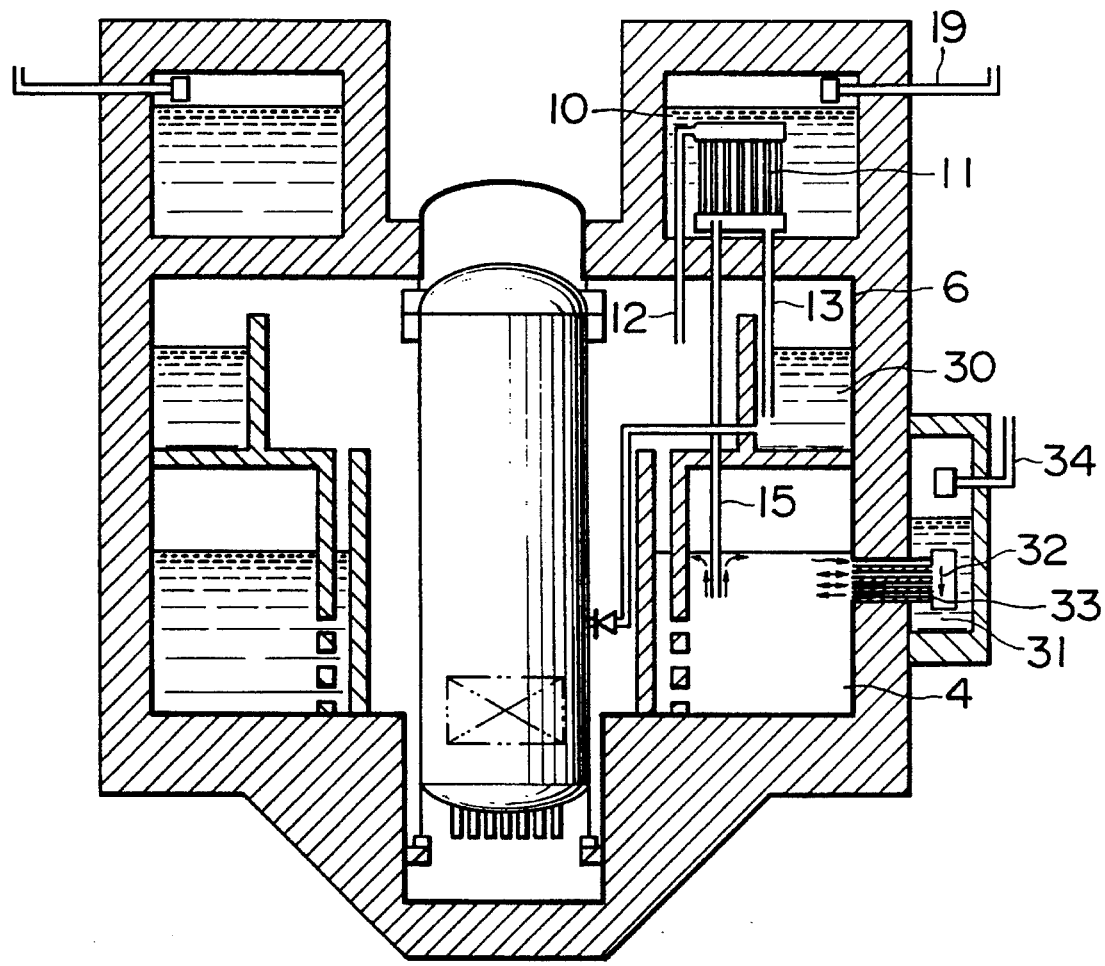
FIGS. 9 to 14 are vertical cross-sectional views of primary containment vessels according to fourth to ninth embodiments of the present invention, respectively.

In this embodiment, with respect to a hydraulic behavior of the suppression pool 4 at the time of an accident, as indicated by arrows in FIG. 9, relatively hot water, produced at the outlet of the gas vent pipe 15 as a result of condensation of the uncondensed steam, moves upward to the water surface of the suppression pool 4 along the gas vent pipe 15, and then spreads over this water surface, and then flows into the heat exchanger 32 through the group of pipes 33 so that the heat of the hot water is released to the cooling water. Therefore, this hot water changes into cold (low-temperature) water which will form a downward flow.

Here, since the suppression pool 4 is consecutively communicated with the heat exchanger 32 by the group of pipes 33, the downward flow will not be stagnant in the heat exchanger 32, thus enabling causing the cold water to flow into the suppression pool 4.

This operation is effected over the range where the gas vent pipe 15 is immersed in the suppression pool 4, and therefore the convection and mixing in the suppression pool 4 are promoted to uniform the temperature of this pool water, thereby preventing any temperature rise only at the water surface of the suppression pool 4.

As a result, as in the above embodiments, the pressure within the primary containment vessel can be suppressed for a long period of time.

The temperature of the water of the cooling water pool 31 provided outside the pressure boundary 6 of the primary containment vessel is raised by the heat released from the heat exchanger 32; however, since evaporated steam from the water surface of the cooling water pool 31 is discharged to the atmosphere via an exhaust pipe 34, the pressure in the structure of the cooling water pool 31 will not be increased, and the structure of the cooling water pool 31 need only to have a sufficient strength to support the weight of the pool water.

The cooling water pool 31 is provided at the side of the suppression pool 4 of the primary containment vessel, and as compared with a cooling water pool 10 having a heat exchanger 11 of a condenser-type heat removal system installed therein, the gravity center of the cooling water pool 31 is relatively low, and it is less necessary to increase its strength in terms of an earthquake-resistant design.

A fifth embodiment of the invention will now be described with reference to FIG. 10.

In this embodiment, a communication means for communicating a suppression pool 4 with a heat exchanger 32 which is immersed in the water of a cooling water pool 31 provided outside a pressure boundary 6 of a primary containment vessel is constituted not by a group of pipes but by a single slit-like flow passage 35. In the fourth embodiment shown in FIG. 9 which employs the group of pipes 33, a wall for preventing the communication of the water of the suppression pool 4 exists between the adjacent pipes 33 in the vertical direction while in this embodiment, such a wall provided in the vertical direction for preventing the flow can be dispensed with. The other construction in the fifth embodiment is the same as that of the fourth embodiment, and therefore explanation thereof is omitted.

With this arrangement, while the basic operation of this embodiment is similar to that of the fourth embodiment, the water of the suppression pool 4 flows more positively through the heat exchanger 32 to promote convection and mixing in the suppression pool 4, and besides, advantageously, the number of penetrations through the pressure boundary 6 of the primary containment vessel is reduced.

A sixth embodiment of the invention will now be described with reference to FIG. 11.

In this embodiment, a heat exchanger 36 is provided in a suppression pool 4 to extend over a vertical range where a gas vent pipe 15 is immersed, and the heat exchanger 36 is communicated by upper and lower pipes 37 and 38 with a cooling water pool 31 which is mounted outside a pressure boundary 6 of a primary containment vessel to be disposed at the side of the suppression pool 4.

The heat exchanger 36 is supported by the pipes 37 and 38 and a structural member 39 connected to the wall of the primary containment vessel. The other construction of this embodiment is the same as the fourth embodiment, and therefore explanation thereof is omitted.

In the suppression pool 4, as indicated by arrows, relatively hot water, produced at an outlet of the gas vent pipe 15 as a result of condensation of uncondensed steam, moves upward to the water surface of the suppression pool 4 along the gas vent pipe 15 to spread over the water surface of this pool, and then is contacted with the heat exchanger 36 to be cooled, and then flows downward.

This downward flow promotes the convection of the water of the suppression pool 4 to promote the mixing with the bulk, thereby uniforming the temperature of the water in the suppression pool 4.

The cooling water of the heat exchanger 36 is heated by the heat transferred from the suppression pool 4, and is lowered in density, and flows into the cooling water pool 31 through the upper pipe 37 to reach the water surface of the cooling water pool 31. The water of the cooling water pool 31 flows into the heat exchanger 36 through the lower pipe 38.

With this arrangement, a temperature difference between the suppression pool 4 and the interior of the heat exchanger 36 is maintained, and the downward flow from the vicinity of the heat exchanger 36 is constantly formed in the water of the suppression pool 4, thereby effecting the mixing of the water of the suppression pool 4.

As a result, a temperature rise only of the water surface of the suppression pool 4 at the time of an accident is prevented, and therefore the pressure within the primary containment vessel can be suppressed for a long period of time.

Figure 12:
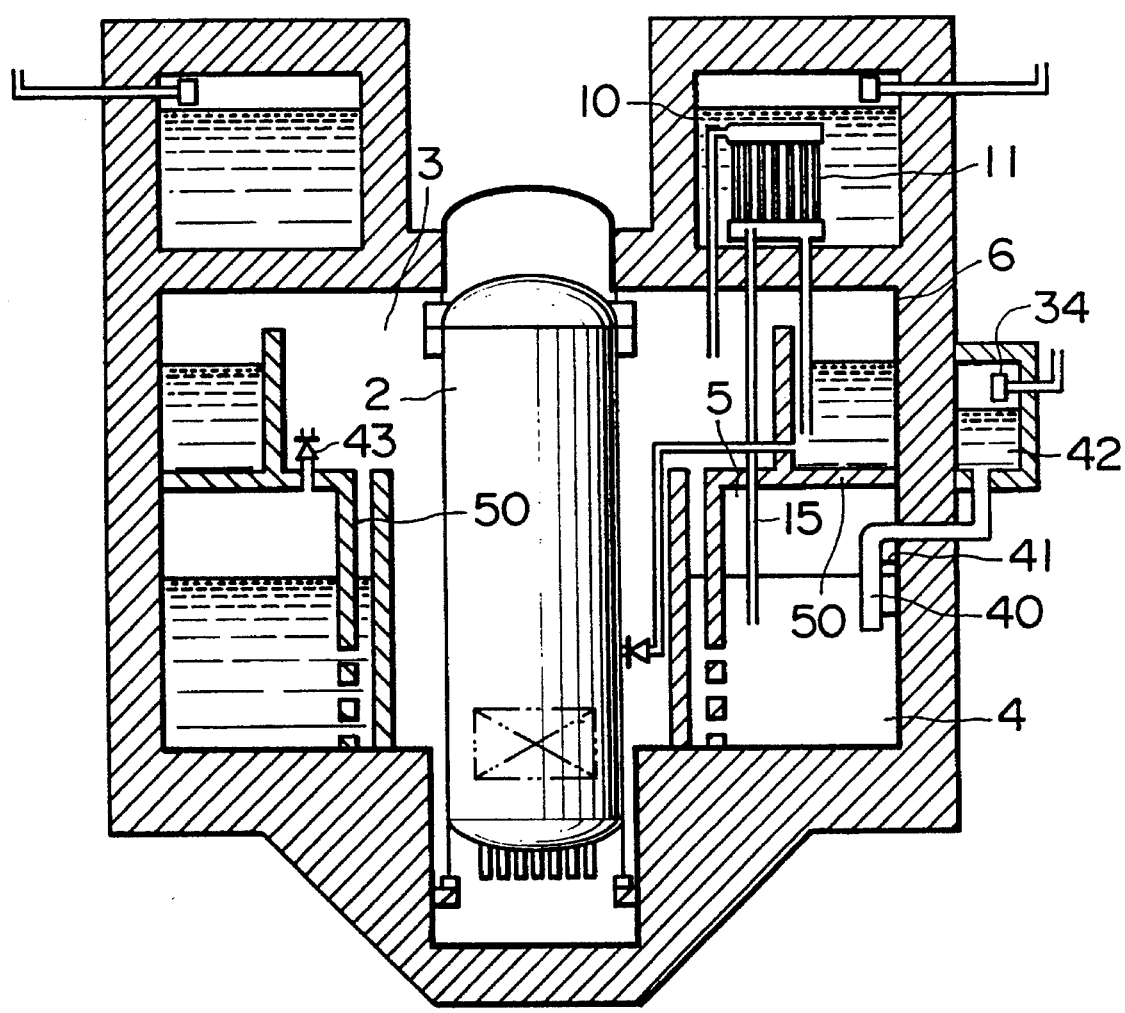

In a seventh embodiment of the invention shown in FIG. 12, a heat exchange portion 40 is provided over a vertical range which covers not only a range where a gas vent pipe 15 is immersed in water of a suppression pool 4 but also part of a wetwell (gas-phase space) 5 above the water surface of the suppression pool 4. The heat exchange portion 40 extends at its upper portion through a pressure boundary 6 of a primary containment vessel, and is connected to an external cooling water pool 42.

The heat exchange portion 40 is supported by structural members 41 connected to the wall of the primary containment vessel. The other construction of this embodiment is the same as that of the fourth embodiment, and therefore explanation thereof is omitted.

Figure 11:
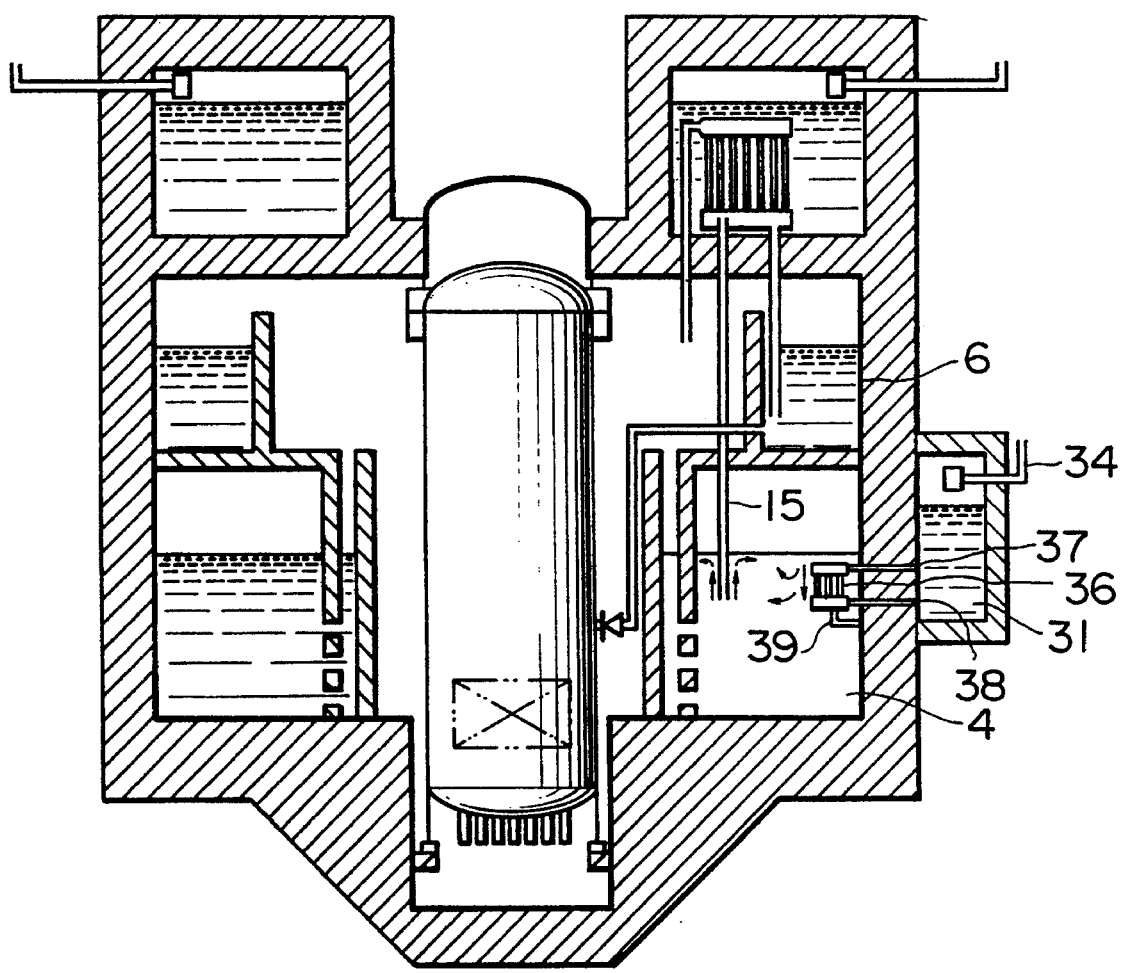

As in the sixth embodiment shown in FIG. 11, a downward flow is formed in the pressure suppression pool 4 by the heat exchanger 40, and the mixing of the water of the suppression pool 4 is promoted, thereby uniforming the temperature of the pool water.

The cooling water in the heat exchange portion 40 is heated by the heat transferred from the suppression pool 4, and therefore is raised in temperature. 10 This cooling water is lowered in density because of this temperature rise, and therefore moves upward within the heat exchange portion 40 to reach the water surface of the cooling water pool 42 provided exteriorly of the pressure boundary 6 of the primary containment vessel.

In this case, even when only the water surface of the cooling water pool 42 becomes hot, the temperature of the heat exchange portion 40 adapted to receive the released heat will not rise, and therefore a temperature difference between this heat exchange portion and the suppression pool 4 is maintained. Thus, there is no problem with the heat transfer from the viewpoint of the operation.

Evaporated steam from the water surface of the cooling water pool 42 is discharged to the atmosphere via an exhaust pipe 34, and therefore the pressure in the structure of the cooling water pool 42 will not be increased, and the structure of the cooling water pool 42 needs only to have a sufficient strength to support the weight of the pool water.

The heat is transferred to the heat exchange portion 40 from the wetwell (gas-phase space) 5 above the water surface of the suppression pool 4. This heat release achieves the following advantage from the viewpoint of maintaining the soundness at the time of an accident of the primary containment vessel.

In a condenser-type heat removal system, basically, a drywell 3 surrounding a reactor pressure vessel 2 is cooled, and noncondensable gas is discharged to the wetwell 5 to be accumulated there. Therefore, during the cooling process after the accident, the drywell 3 is cooled greatly, so that the pressure within the drywell 3 may become lower than the pressure within the wetwell 5.

The pressure applied from the wetwell 5 at this time is an external pressure for a partition wall 50 which separates the wetwell 5 and the drywell 3 from each other and has a small proof stress in the structural strength.

A kind of check valve 43 called "vacuum breaker" is provided for preventing damage to the partition wall 50 when the pressure within the wetwell 5 becomes higher than the pressure within the drywell 3.

When the pressure within the wetwell 5 becomes greater than the pressure within the drywell 3, the check valve 43 is opened in accordance with this pressure difference therebetween, thereby making the pressure of the wetwell 5 equal to the pressure of the drywell 3.

In a conventional construction, if there develops a leakage in the check valve 43, steam flows directly into the wetwell 5 from the drywell 3 at the time of an accident, thereby increasing the pressure within the primary containment vessel. To prevent this, the flow area of the check valve 43 is reduced, and also the strength of the partition wall 50 is increased, thereby avoiding the influence of the leakage.

In this embodiment, even if steam flows directly into the wetwell 5, for example, because of a leakage in the vacuum breaker 43, it is condensed by the heat exchange portion 40 exposed in the wetwell 5, so that the increase of the steam partial pressure, and hence the pressure increase of the primary containment vessel, is suppressed.

With this arrangement, the reliability of the primary containment vessel at the time of an accident is enhanced, and besides by increasing the size of the vacuum breaker 43 while reducing the number of the vacuum breakers, and by reducing the strength of the partition wall 50, the number of the parts as well as the amount of the material can be reduced, which results in a reduced cost.

Moreover, since a penetrating portion through the pressure boundary 6 of the primary containment vessel, which is required for communicating the heat exchange portion 40 with the cooling water pool 42, is reduced to a minimum, the reliability of the primary containment vessel can be enhanced.

Figure 13:
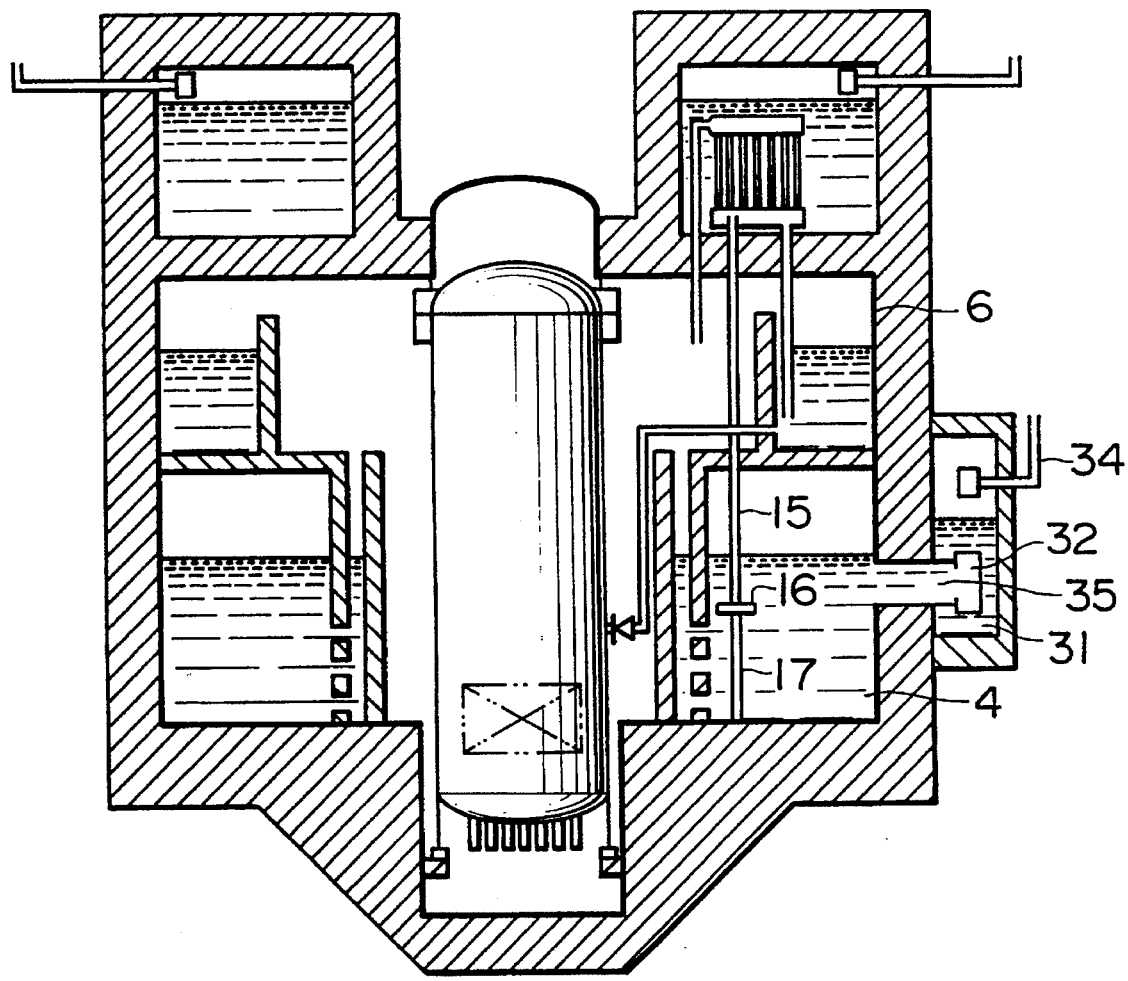

An eighth embodiment of the invention will now be described with reference to FIG. 13.

Figure 10:
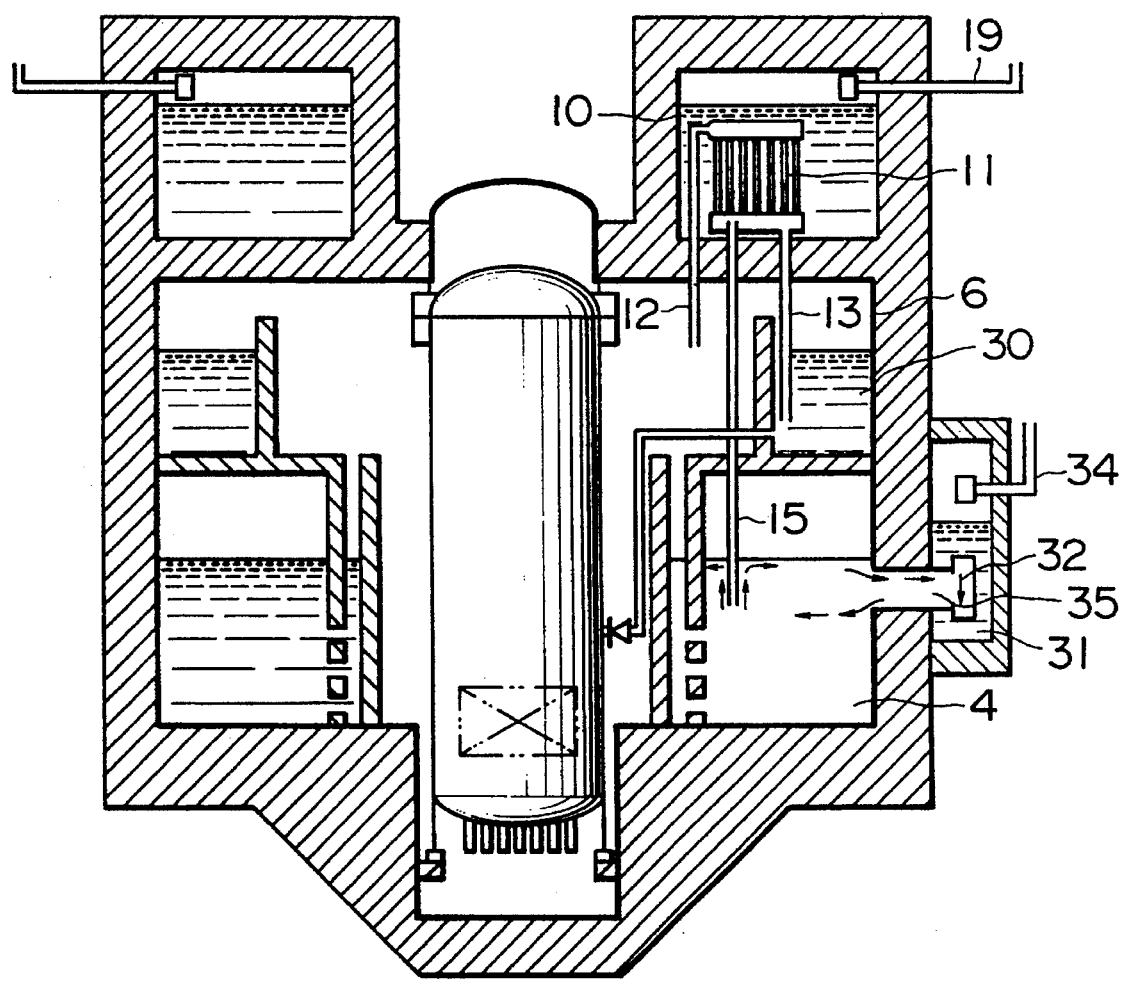

In this embodiment, an outlet portion of a gas vent pipe 15 disposed in water of a suppression pool 4 is defined by the same pipes 16 as shown in the first embodiment of FIGS. 1 to 3, and there is provided the same cooling water pool 31 as shown in FIG. 10 and outside a pressure boundary 6 of a primary containment vessel. A heat exchanger 32 is provided to be immersed in the water of the cooling water pool 31, and the heat exchanger 32 is communicated with the suppression pool 4 by a single slit-like flow passage 35 vertically extended generally over a vertical range where the gas vent pipe 15 is immersed. The other construction of this embodiment is the same as that of the first embodiment and that of the fifth embodiment, and therefore explanation thereof is omitted.

In this embodiment, thanks to the provision of the horizontally-disposed pipes 16 at the outlet portion of the gas vent pipe 15, the region where uncondensed steam is mixed with the water of the suppression pool 4 is enlarged, thereby preventing a localized region of this pool water from becoming hot. And besides, by the provision of the heat exchanger 32, the water of the suppression pool 4 is caused to form a downward flow, thereby promoting the convection and mixing in this suppression pool 4. These two effects cooperate with each other in a synergistical manner to positively uniform the temperature of the water of the suppression pool 4 without any problem.

Figure 14:
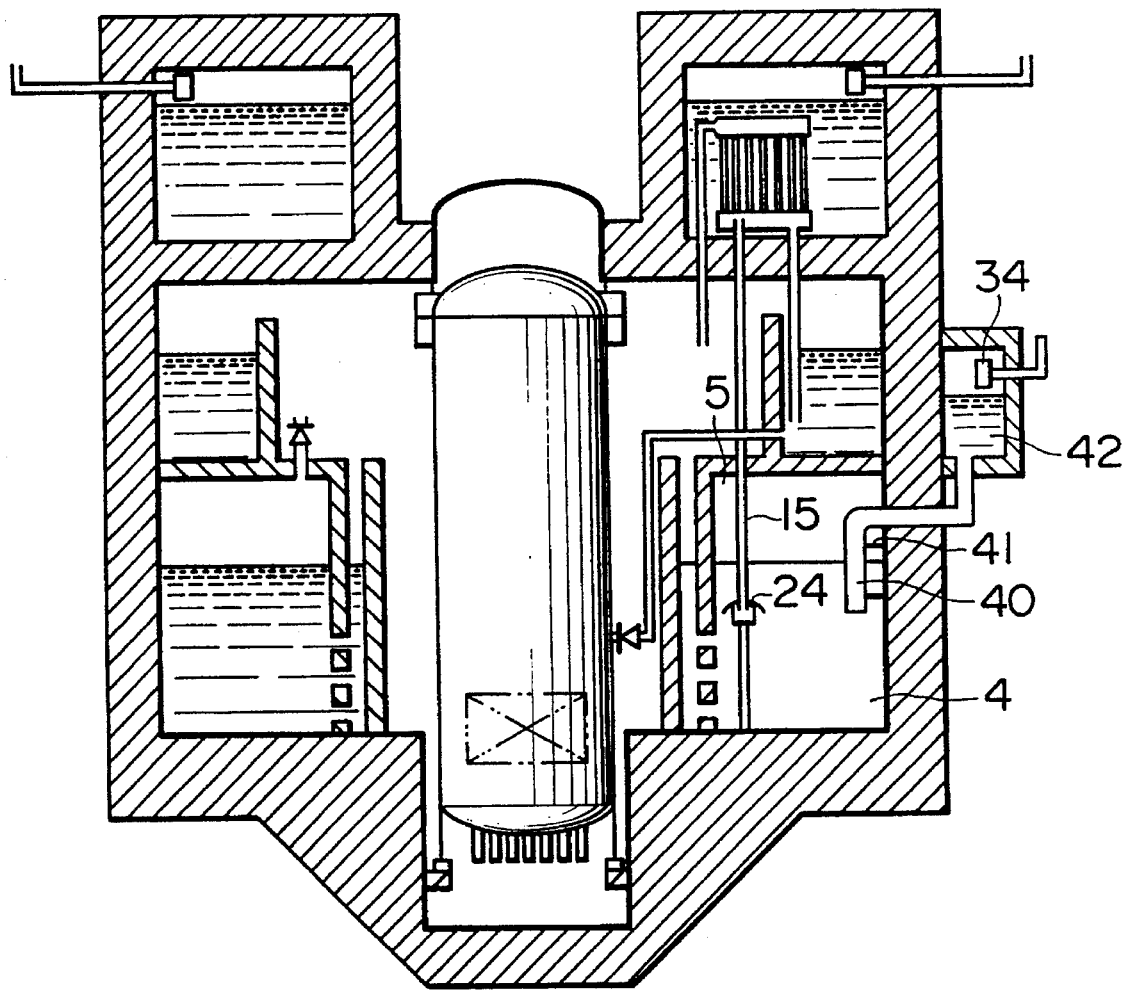

FIG. 14 shows a ninth embodiment of the invention.

In this embodiment, a cover 24 as described above for the second embodiment of FIG. 6 is horizontally provided adjacent to and above an outlet of a gas vent pipe 15, and there is provided a heat exchange portion 40 as described above for the seventh embodiment of FIG. 12, which covers both regions of a suppression pool 4 and a wetwell 5. The other construction of this embodiment is the same as that of the second embodiment and that of the seventh embodiment, and therefore explanation thereof is omitted.

In this embodiment, also, the region where uncondensed steam passed through the gas vent pipe 15 is mixed with the water of the suppression pool 4 is enlarged, thereby preventing a localized region of this pool water from becoming hot. And besides, by the provision of the heat exchange portion 40, the water of the suppression pool 4 is caused to form a downward flow, thereby promoting the convection and mixing in this suppression pool 4. These two effects cooperate with each other in a synergistical manner to positively uniform the temperature of the water of the suppression pool 4 without any problem.

As described above, the techniques described in FIGS. 1 to 8 and the techniques described in FIGS. 9 to 12 will not interference with each other from the viewpoints of installation and operation, and therefore the above embodiments can be suitably combined.

According to the invention as defined in claim 1, the region where uncondensed steam from the heat exchanger of a condenser-type heat removal system in the cooling system for a primary containment vessel is mixed with the water of the suppression pool is enlarged to thereby reduce the pressure within the reactor pressure vessel, and the reliability is enhanced at the time of an accident when this cooling system is required to be operated. And besides, a design strength of the primary containment vessel can be reduced, thereby reducing the cost.

According to the invention as defined in claim 2, the region where uncondensed steam from the heat exchanger of a condensation-type heat removal system in the cooling system for a primary containment vessel is mixed with the water of the suppression pool is enlarged, and the condensation is again promoted at the gas-to-liquid contact surface in the water of the suppression pool to obtain a lower temperature, thereby reducing the pressure within the primary containment vessel more suitably. Therefore, the reliability is enhanced at the time of an accident when this cooling system is required to be operated, and besides, a design strength of the primary containment vessel can be reduced, thereby reducing the cost more suitably.

According to the invention as defined in claim 3, the region where uncondensed steam from the heat exchanger of a condensation-type heat removal system in the cooling system for a primary containment vessel is mixed with the water of the suppression pool is enlarged, and the condensation is again more promoted at the gas-to-liquid contact surface (which is as large as possible) in the water of the suppression pool to obtain a lower temperature, thereby reducing the pressure within the primary containment vessel more suitably. Therefore, the reliability is enhanced at the time of an accident when this cooling system is required to be operated, and besides, a design strength of the primary containment vessel can be reduced, thereby reducing the cost still more suitably.

According to the invention as defined in claim 4, the effect of the invention of claim 3 can be achieved by the pipe arrangement.

According to the invention as defined in claim 5, the effect of the invention of claim 3 can be readily achieved without the use of such a pipe arrangement.

According to the invention as defined in claim 6, the re-condensation at the gas-to-liquid contact surface in the water of the suppression pool, as described above for the invention of claim 3, is repeated, thereby further promoting the condensation. By doing so, the effect of the invention of claim 3 is further enhanced.

According to the invention as defined in claim 7, the region where uncondensed steam from the heat exchanger of a condenser-type heat removal system in the cooling system for a primary containment vessel is mixed with the water of the suppression pool is enlarged, and the condensation of the uncondensed steam is promoted in the horizontal pipes, and then the condensed steam is discharged into the water of the suppression pool over a wide range. By doing so, the temperature of the water surface of the suppression pool is restrained from rising, thereby reducing the pressure within the primary containment vessel. Therefore, the reliability is enhanced at the time of an accident when this cooling system is required to be operated, and besides, a design strength of the primary containment vessel can be reduced, thereby reducing the cost still more suitably.

According to the invention as defined in claim 8, there is provided the gas vent pipe suitably used for applying the condenser-type heat removal system to the cooling system for a primary containment vessel, the gas vent pipe serving as introducing the vent fluid into the water of the suppression pool so that the vent fluid can be mixed with this pool water in a promoted manner.

According to the invention as defined in claim 9, by the addition of the baffle, there is readily provided the gas vent pipe suitably used for applying the condenser-type heat removal system to the cooling system for a primary containment vessel, the gas vent pipe serving as introducing the vent fluid into the water of the suppression pool so that the vent fluid can be mixed with this pool water in a promoted manner.

According to the invention as defined in claim 10, by the addition of the baffles, there is readily provided the gas vent pipe suitably used for applying the condenser-type heat removal system to the cooling system for a primary containment vessel, the gas vent pipe serving as introducing the vent fluid into the water of the suppression pool so that the vent fluid can be mixed with this pool water in a more promoted manner.

According to the invention as defined in claim 11, there is provided the cooling system for a primary containment vessel which can effect the cooling for a long period of time after the initiation of an accident. And besides, a design strength of the primary containment vessel is reduced, thereby reducing the cost more suitably.

According to the invention as defined in claim 12, in addition to the effect of the invention of claim 11, a downward flow is produced in the water of the suppression pool, so that the water of the suppression pool is caused to reside over a wide range. Therefore, the temperature of the water of the suppression pool is uniformed over a wide range in a vertical direction, so that a temperature rise of the water surface of the suppression pool is prevented, thereby decreasing the pressure within the primary containment vessel. Therefore, the reliability is enhanced at the time of an accident when this cooling system is required to be operated, and besides, a design strength of the primary containment vessel can be reduced, thereby reducing the cost. With this arrangement, these advantageous effects can be obtained more effectively than with the type of construction in which the vent fluid is dispersingly discharged from the gas vent pipe.

According to the invention as defined in claim 13, in addition to the effect of the invention of claim 12, the space above the suppression pool is cooled, thereby further enhancing the cooling effect. This further enhances the reliability at the time of an accident, and also reduces a design strength of the primary containment vessel, thereby reducing the cost more suitably.

According to the invention as defined in claim 14, as a result of release of the heat from the gas vent to the water of the suppression pool, the temperature of this pool water tends to rise at the depth of water at which the outlet of the gas vent is disposed; however, as a result of this temperature rise, the water of the suppression pool at the region where of the gas vent is immersed is cooled to produce a downward flow, thereby producing a convection in the pool water. Therefore, the heat is dissipated in a mixing manner over the entire region of the water of the suppression pool beyond the depth of water at which the outlet of the gas vent is disposed. As a result, a temperature rise of the water surface of the suppression pool is prevented, thereby reducing the pressure within the primary containment vessel. Therefore, the reliability is enhanced at the time of an accident when this cooling system is required to be operated, and besides, a design strength of the primary containment vessel can be reduced, thereby reducing the cost.

According to the invention as defined in claim 15, in addition to the effect of the invention of claim 14, the space above the suppression pool is also cooled directly, and therefore it is easy to take a measure to devise a pressure-resisting construction, thus enabling reducing the manufacturing cost.

According to the invention as defined in claim 16, in addition to the effect of the invention of claim 14 or the effect of the invention of claim 15, the heat can be discharged from the heat exchanger to the atmosphere, and therefore a pressure increase due to the heat released from the heat exchanger is avoided, and hence the structure can be less pressure-resistant. This reduces the cost.

According to the invention as defined in claim 17, there is provided the cooling system for a primary containment vessel which has both of the effect of claim 14, claim 15 or claim 16 and the effect of claim 8, claim 9 or claim 10.

What is claimed is:

1. In a cooling water system for a primary containment vessel in a nuclear power plant which system includes a gas vent which extends from a heat exchanger of a condenser-type heat removal system into a suppression pool to be communicated with the water in the suppression pool;

the improvement wherein means for restraining upward movement of a vent fluid is provided on a portion of said gas vent disposed in the suppression pool to extend horizontally to an extent greater than a flow area of said gas vent, said restraining means including communication holes communicated with the water of the suppression pool and disposed below a level where a maximum gas-to-liquid contact area is formed, and said communication holes being distributed over a range larger than the flow area of said gas vent, and in which said restraining means comprises horizontal pipes connected to and communicated with said gas vent in a plurality of directions, each of said pipes having a closed distal end, and each of said pipes having openings which are in free communication with the water of the suppression pool and are disposed only below a horizontal plane in which axes of said pipes lie.

2. In a cooling system for a primary containment vessel in a nuclear power plant which system includes a gas vent which extends from a heat exchanger of a condensation-type heat removal system into a suppression pool to be communicated with the water in the suppression pool;

the improvement wherein a plurality of horizontal pipes are connected to and communicated with a portion of said gas vent, which is disposed in the suppression pool, in a plurality of different directions, each of said pipes having a plurality of openings which are in communication with the water in the suppression pool to be arranged in a dispersed manner below a horizontal plane in which axes of said pipes lie, and an entire portion of each of said pipes disposed above said horizontal plane being closed.

3. A cooling system according to claim 2, in which said gas vent includes a main pipe portion and said plurality of horizontal pipes are provided on a lower end portion or a portion near said lower end portion of said main pipe portion in communication therewith in different directions.

* * * * *